United States Patent [19]

Hamada et al.

[11] Patent Number: 4,891,699
[45] Date of Patent: Jan. 2, 1990

[54] RECEIVING SYSTEM FOR BAND-COMPRESSION IMAGE SIGNAL

[75] Inventors: Masanori Hamada, Kadoma; Takeshi Inoue, Matsuyama; Mitsuo Isobe, Osaka; Yuichi Ninomiya; Yoshimichi Ohtsuka, both of Kawasaki; Yoshinori Izumi, Tokyo, all of Japan

[73] Assignee: Matsushita Electric Industrial Co., Ltd., Osaka, Japan

[21] Appl. No.: 314,088

[22] Filed: Feb. 23, 1989

[51] Int. Cl.[4] .................. H04N 7/12; H04N 7/18; H04N 9/88; H04N 5/94
[52] U.S. Cl. .................. 358/136; 358/105; 358/314; 358/336; 360/38.1
[58] Field of Search .............. 358/135, 136, 260, 105, 358/314, 336, 138; 360/38.1

[56] References Cited

U.S. PATENT DOCUMENTS

| | | | |
|---|---|---|---|
| 4,090,221 | 5/1978 | Connor | 358/136 |
| 4,692,801 | 9/1987 | Ninomiya et al. | 358/136 |
| 4,745,459 | 5/1988 | Ninomiya et al. | 358/138 |
| 4,760,446 | 7/1988 | Ninomiya et al. | 358/105 |
| 4,771,331 | 9/1988 | Bierling et al. | 358/136 |
| 4,802,006 | 1/1989 | Iinuma et al. | 358/135 |

OTHER PUBLICATIONS

HD-TV Broadcasting System Using Single Channel Satellite (MUSE), Technical Report of the Television Society, TEBS95-2, published Mar. 22, 1984.
"Home Video Disk for MUSE System", Technical Report of the Television Society, TEBS99-4, published on Sep. 20, 1984.

Primary Examiner—John K. Peng
Attorney, Agent, or Firm—Stevens, Davis, Miller & Mosher

[57] ABSTRACT

When the receiving system for a band-compression image signal receives a dropout signal representing a dropout portion of an image signal, an output of the third delay circuit of the temporal filter for motion detection processing, that is, motion information of an image signal, which precedes by one field, and a dropout signal activate the signal selection control circuit to produce an output signal for controlling the operation of the signal selection circuit, so that an output signal of the first delay circuit is selected for a static portion of an image, and an output signal of the dropout compensation circuit is selected for a moving portion of an image, so as to effect compensation control of the dropout portion of an image signal, thereby preventing deterioration of the quality of an image.

4 Claims, 3 Drawing Sheets

RECEIVING SYSTEM FOR BAND-COMPRESSION IMAGE SIGNAL

BACKGROUND OF THE INVENTION

1. Field of the Invention

The present invention relates to a receiving system for television signals or more in particular to a receiving system for an image signal band-compressed by multiple sub-Nyquist sampling.

2. Description of the Prior Art

In transmitting a broad-band image signal such as a high-definition television signal, a system has been proposed for reducing the signal band width by sub-Nyquist sampling as disclosed in "HD-TV Broadcasting System Using Single Channel Satellite (MUSE)", Technical Report of The Television Society, TEBS95-2, Published on Mar. 22, 1984. In this system, which is called the multiple sub-Nyquist sampling transmission system of the motion compensation type, the sampling phase is offset between fields, between frames and between lines to complete a cycle of sampling phase by four fields, thereby performing transmission of image signals. The receiving side is provided with a frame memory, and it stores image signals transmitted sequentially over four fields. The image signals are combined to restore a television image. A well-known television system of the 2-to-1 interlaced scanning is based on the above-mentioned inter-frame offset sampling processing and the reproducing processing of the image signals.

The system for transmitting image signals by the inter-field and inter-frame offset sampling often has a complicated decoding circuit for receiving these image signals and reproducing a television image. Further, it is practically difficult to detect moving parts of images completely from among the image signal subjected to band-compression processing. Accordingly, it is effective to transmit an auxiliary signal for simplifying the structure of the decoding circuit, namely, to transmit a control signal for the receiving system together with the image signal. In the above-mentioned system, various control signals including a motion vector signal, a motion detection circuit control signal, etc. are transmitted.

The process of receiving a television signal and reproducing an image by the above-mentioned system basically requires a frame memory to be contained in the receiving system. Then, the interpolation processing of dropouts in the input signal may be performed by using this frame memory. A dropout signal interpolation system is disclosed, for example, in "Home Video Disk for MUSE System", Technical Report of The Television Society, TEBS99-4, Published on Sept. 20, 1984, and it has a configuration such as shown in FIG. 3. In FIG. 3, an image signal of 16.2 MBPS supplied to a signal input terminal 1 is applied to an inter-frame interpolation processing loop including a switch 2 and field memories 3 and 4. A delay time of this loop is set to approximately 562 H at the field memory 3 and to approximately 563 H at the field memory 4, amounting to one frame in total, where H denotes one horizontal scanning period. These memories 3 and 4 are subjected to inter-frame interpolation processing by the switch 2 which performs a selective operation at approximate time intervals of 30 nanoseconds, thereby supplying the next stage with a signal of 32 MBPS formed by time division multiplexing of respective image signals having a time difference of one frame therebetween. The changing-over operation of the switch 2 is controlled by a change-over signal 5 (hereinafter called "a subsample clock signal"), which is supplied through a subsample clock control circuit 6 to effect changing over of a movable arm of the switch 2 so as to perform switching of the output of the switch 2 between the image signal supplied to the fixed terminal a of the switch 2 and the output signal of the inter-frame interpolation processing loop supplied to the fixed terminal b of the switch 2, thereby performing an inter-frame interpolation processing operation. When a dropout occurs in an input signal, on the other hand, predetermined signal dropout information (hereinafter called "a dropout signal") is supplied to the terminal 7, and the control signal from the subsample clock control circuit 6 is supplied to the switch 2 in such a manner as to change over the switch 2 to terminal b. As a result, the field memory 3 is supplied again with a signal which precedes by one frame. In this way, the dropout signal is interpolated. An output produced from the inter-frame interpolation loop is supplied to a spatial interpolation processing circuit 8, a motion detection circuit 9 and a mixing circuit 10. The spatial interpolation processing circuit 8 extracts a signal of an associated field from among signals subjected to inter-frame interpolation processing, and, after subjecting them to predetermined spatial interpolation processing, the spatial interpolation processing circuit 8 supplies a moving image portion thereof to the mixing circuit 10. The motion detection circuit 9 detects the moving portion by using the inter-frame correlation of image signals. The moving signal portion thus detected is expanded along the time axis, that is, in the direction of a field or frame, through a temporal filter 14 which is composed of a maximum (MAX) selection circuit 11, a field memory 12 and a coefficient circuit 13, and then an output signal of the temporal filter 14 is supplied to the mixing circuit 10. The mixing circuit 10 performs mixing control of a signal associated with the static portion of an image supplied through conductors 15 and 16 and a signal representing a moving image portion by using a motion detection signal supplied through a conductor 17, and it supplies a reproduced high-definition television signal to a signal output terminal 18.

The above-mentioned well-known receiving system for a band-compression image signal is provided with a memory for inter-frame interpolation processing, so that it is capable of interpolating a dropout portion of an input image signal with a signal, which precedes by two frames, by changing over the switch 2 to the terminal b by using a dropout signal supplied externally from through a terminal 7. This processing permits complete compensation for a static image. However, a rapidly moving image portion, a varying scene, etc. would be deteriorated in the image quality, if it is interpolated by a signal which precedes by two frames.

Further, in the aforementioned system configuration which lacks a dropout compensation circuit, when a dropout occurs in an image signal, a difference between a signal associated with the dropout portion and an output signal, which precedes the dropout portion by two frames, is detected by the motion detection circuit 9 and time-expanded by the temporal filter 14 at the same time. As a result, an undesirable motion signal remains in the dropout portion of the image signal for some length of time from the time of generation of the image signal dropout. In other words, normal determination of a static image and a moving image is not effected for some length of time at the image signal dropout portion, resulting in a problem that, in such a case as mentioned above, a portion, which should be processed as a static image, is processed as a moving image, thereby deteriorating the image quality conspicuously.

SUMMARY OF THE INVENTION

Accordingly, it is an object of the present invention to provide a receiving system for an image signal subjected to band-compression processing by multiple sub-Nyquist sampling.

According to the present invention, there is provided a receiving system for a band-composed image signal, which system is supplied with a band-compressed image signal and a dropout signal representing a dropout portion of the band-compressed image signal, comprising a first delay circuit for inter-frame interpolation, a dropout compensation circuit including a second delay circuit of at least one horizontal scanning period, a signal selection circuit connected to an output of the first delay circuit and an output of the dropout compensation circuit for selecting one of an image signal, an output signal of the first delay circuit and an output signal of the dropout compensation circuit, a motion detection circuit coupled to the first delay circuit, a temporal filter including a third delay circuit for expanding the output of the motion detection circuit along the time axis, and a signal selection control circuit which is processed by an output signal of the third delay circuit and a dropout signal to produce an output signal for controlling the operation of the signal selection circuit.

According to the system of the present invention having such a construction as mentioned above, upon receipt of a dropout signal representing a dropout portion of an image signal, an output of the third delay circuit of the temporal filter for motion detection processing, that is, motion information of an image signal which precedes by one field, and a dropout signal activate the signal selection control circuit to produce an output signal for controlling the operation of the signal selection circuit, so that an output signal of the first delay circuit (field memories 3 and 4) is selected for a static portion, and an output signal of the dropout compensation circuit is selected for a moving portion, thereby effecting compensation control of the dropout portion.

Further, in the system of the present invention, the temporal filter is controlled by using a dropout signal, thereby suppressing undesirable time expansion of a motion signal and preventing image quality deterioration from being caused by an image signal dropout.

DESCRIPTION OF THE PREFERRED EMBODIMENTS

Figure 1:
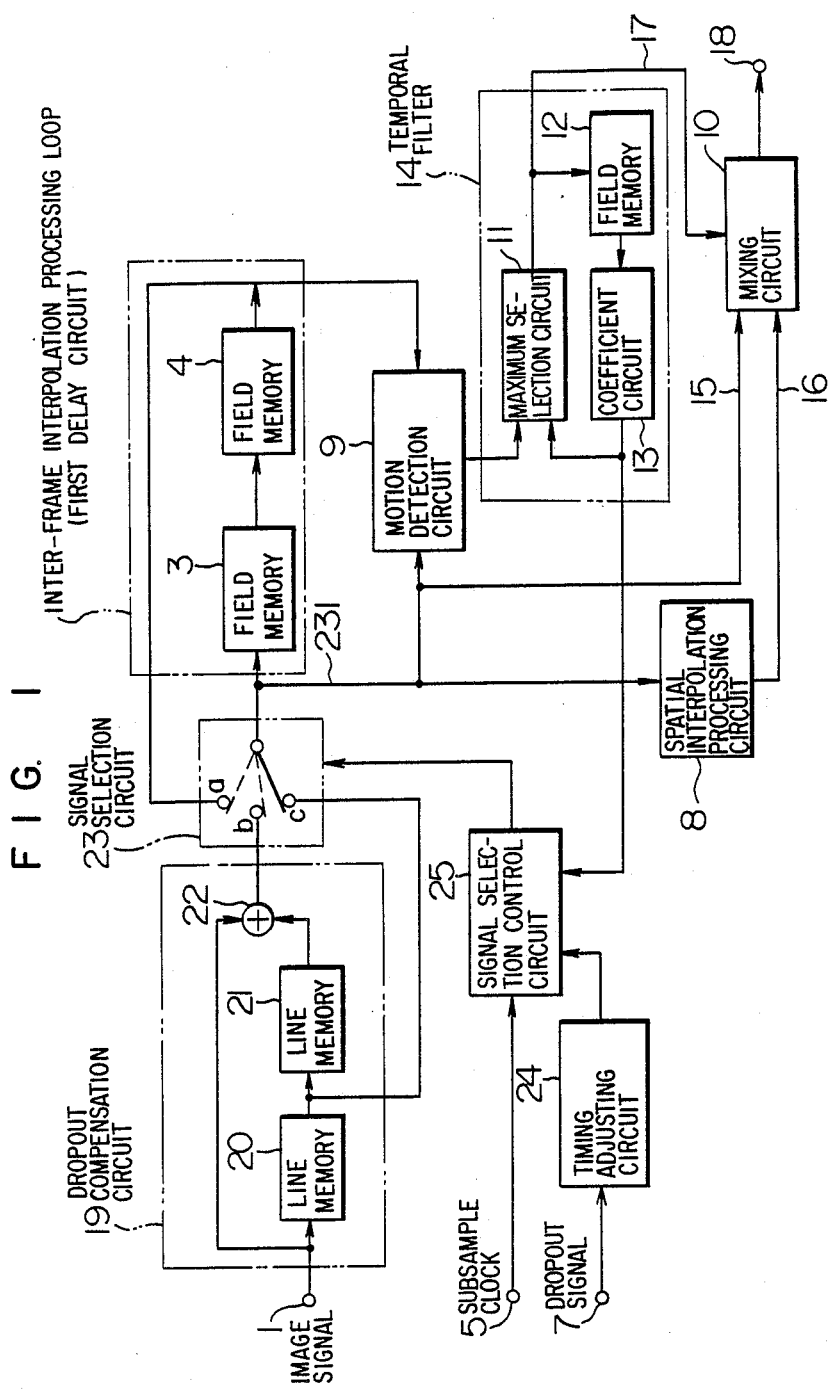
FIG. 1 is a block diagram showing the receiving system for a band-compression image signal according to an embodiment of the present invention.

A configuration of the receiving system for a band-compression image signal according to an embodiment of the present invention is shown in FIG. 1.

Figure 3:
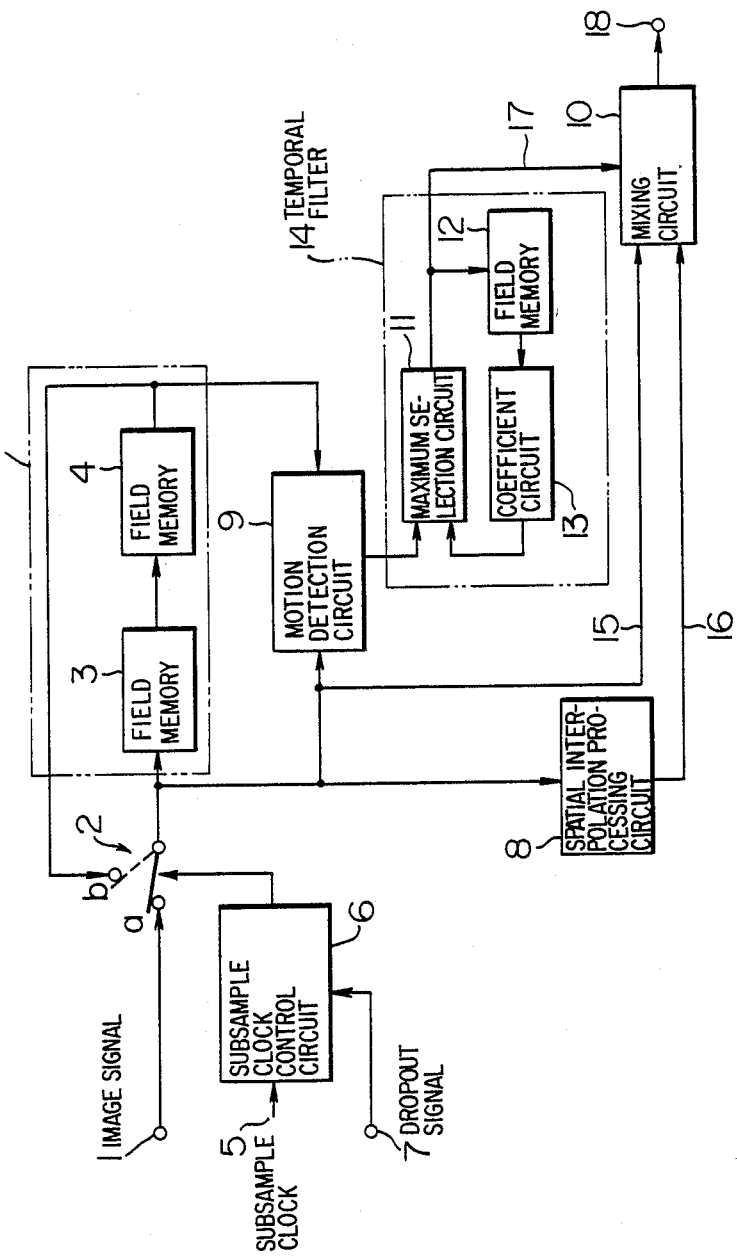
FIG. 3 is a block diagram showing a conventional receiving system for a band-compression image signal.

In FIG. 1, those component parts, which are designated by the same reference numerals as those of the prior art system shown in FIG. 3, will not be described again. Numeral 19 designates a dropout compensation circuit which uses a two-horizontal-period delay circuit, numerals 20, 21 a line memory making up a second delay circuit, numeral 22 a computation circuit for generating an interpolation signal for a dropout portion from the scanning lines above and below an associated processing line, numeral 23 a signal selection circuit for selecting one of the signals including an output signal of the dropout compensation circuit 19 applied to a terminal b, an output signal of the first delay circuit (field memories 3 and 4) applied to a terminal a, and an image signal which is supplied to the signal input terminal 1 and which is also applied to a terminal c, and numeral 25 a signal selection control circuit controlled by output signals of the third delay circuit (field memory 12) of the temporal filter 14, a timing adjusting circuit 24, and a subsample clock 5. Numeral 24 designates a timing adjusting circuit for adjusting a delay which is caused by the dropout compensation circuit 19 due to its use of a second delay circuit (line memories 20, 21) for two horizontal scanning periods.

The operation of the receiving system according to this embodiment having such a construction as mentioned above will be explained.

In FIG. 1, in a normal condition, that is, in the case where no dropout occurs, the signal selection control circuit 25 sends out the subsample clock 5 straightly, and the signal selection circuit 23 effects switching of an output signal thereof between the output signal of the first delay circuit at the terminal a and the output signal of the single line memory 20 of the dropout compensation circuit 19 at the terminal c in response to the subsample clock 5. If a dropout occurs, that is, if a dropout signal is applied to the terminal 7, whether the image signal contains a moving portion or not is decided by a output of the third delay circuit of the temporal filter 14. A control signal from the signal selection control circuit 25 is supplied to the signal selection circuit 23 so that, if there is no moving portion (which implies a static image), the signal selection circuit 23 is switched to the terminal a, while, if there is any moving portion (which implies a moving image), it is switched to the terminal b. Specifically, the signal selection circuit 23 operates in the manner shown in the following table.

| Dropout signal | Motion | Signal selected |
|---|---|---|
| Applied | Present | b (Output of the dropout compensation circuit 19) |
|  | Absent | a (Output of the first delay circuit) |
| Not applied | X | a and c |

The operations of the spatial interpolation circuit 8, the mixing circuit 10 and the motion detection circuit 9 supplied with an output signal of the signal selection circuit 23 through the conductor 231 are identical with those of the prior art system, and therefore they will not be explained in detail here.

As explained above, according to the first embodiment of the present invention, in the operation of compensating for a dropout, the selection of a dropout compensation image signal is made adaptively in accordance with presence or absence of a motion of an image in a field immediately preceding an associated field, thereby making it possible to effect satisfactory correction of not only a static image portion but also a moving image portion.

Figure 2:
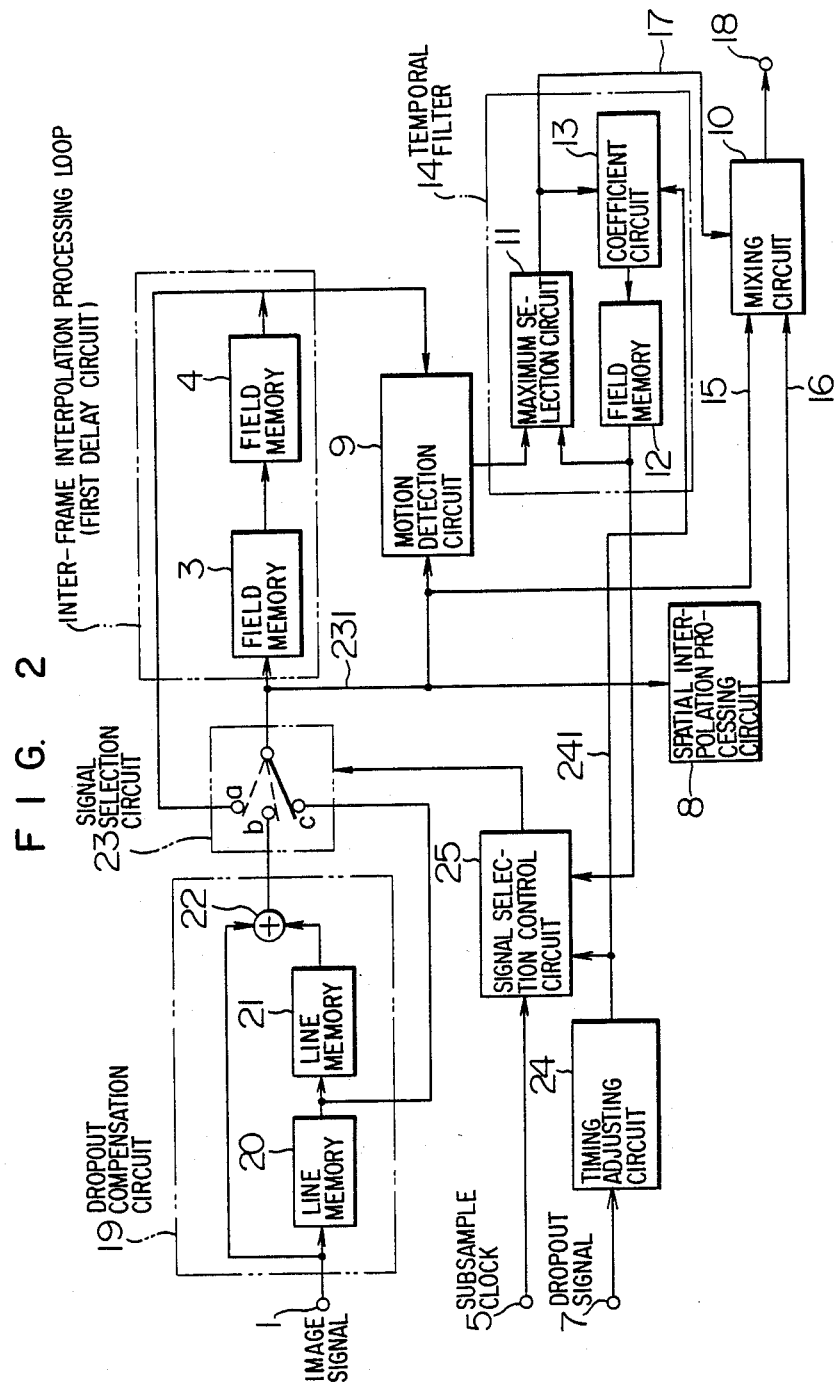
FIG. 2 is a block diagram showing the receiving system for a band-compression image signal according to another embodiment of the present invention.

Another embodiment of this invention is shown in FIG. 2, which is so configured as to prevent any undesirable motion signal from being caused by a dropout. In this embodiment, a dropout signal produced from a timing adjusting circuit 24 is supplied through a conductor 241 to a coefficient circuit 13 of the temporal filter 14. A motion signal associated with the dropout portion detected by the motion detection circuit 9 is prevented from being expanded along the time axis, that is, in the direction of a field or frame by the temporal filter 14. Specifically, the coefficient circuit 13 responds to the application thereto of a dropout signal through the conductor 241 so that it is controlled to reduce the coefficient thereof for the particular time thereby to suppress the amplitude of a motion signal supplied to the field memory 12. As a result, in the case where a spot or linear dropout occurs in a static image portion only of a single N field, the signal selection circuit 23 selects an image signal, which is formed by multiplexing a signal transmitted from the field memory 4 to precede by two frames, at the terminal of the signal selection circuit 23, and therefore both input signals to the motion detection circuit 9 become identical with each other, thereby preventing any motion signal from being caused by the inter-frame correlation, that is, the inter-frame difference signal. Also, in view of the fact that a motion signal produced from the motion detection circuit 9 is zero for a static image portion in a field preceding the N field, the coefficient control of the coefficient circuit 13 by a dropout signal has no effect on a motion signal transmitted by the temporal filter 14 through the conductor 17, and thus the motion signal is kept zero. In the case where a dropout occurs in a motion image portion, on the other hand, the signal selection circuit 23 selects an image signal supplied to the terminal b thereof. As a result, the motion detection circuit 9 detects a difference between a compensated signal and a signal preceding by one or two frames. If an image, in which a dropout has occurred, includes one of moving image portions which continue for several fields before and after the associated field, a maximum (MAX) selection circuit 11 substantially selects an output of the motion detection circuit 9, and therefore motion signals are continuously applied to the conductor 17. The advantage of this embodiment that the coefficient circuit 13 is controlled by a dropout signal sent through the conductor 241 is obtained at the time of transition from a moving image to a static image. In the event that a dropout occurs in a moving image portion of a field immediately preceding a static image, for instance, the coefficient circuit 13 is controlled by the dropout signal to reduce the coefficient below a normal value. Thus, with respect to a dropout portion occurring in a moving image portion of an associated field, a motion signal, which is outputted by the field memory 12 and which is contained in a field up to an immediately preceding field, controls the signal selection circuit 23 to select an image signal at the terminal b thereof, and hence the motion detection circuit 9 supplies a motion signal to one input of the maximum (MAX) selection circuit 11. Then, at the same time, a motion signal is supplied to the conductor 17. However, since the coefficient circuit 13 is made to have its coefficient reduced as compared with a coefficient value under a normal operation, the amplitude of a motion signal for the dropout portion supplied to the field memory 12 is greatly reduced. Thus, when a static image occurs in the next field, the output of the motion detection circuit 9 become zero, and the maximum (MAX) selection circuit 11 selects a motion signal on the side of the field memory 12. Thus, the maximum (MAX) selection circuit 11 is able to reduce the amplitude of a motion signal to zero sharply by a repeated operation conducted through a closed circuit including the maximum (MAX) selection circuit 11, the coefficient circuit 13, and the field memory 12. In thus way, an undesirable excessive time expansion of a motion signal until after the transition to a static image can be prevented by adaptive control, and, therefore, a time period, in which a static image portion is processed as a moving image, can be shortened, thereby preventing the image quality from being deteriorated by the dropout.

Although, in the above-described embodiments of this invention, the dropout compensation circuit 19 employs a delay circuit for providing a delay of two horizontal scanning periods (2H), it may be changed to employ a delay circuit for providing a delay of one horizontal scanning period (H). Further, the temporal filter 14 may be of a non-cyclic type instead of a cyclic type. It is needless to say that various other modifications can also be made in embodying this invention.

It will thus be understood from the foregoing description that, according to the receiving system for a band-compression image signal of the present invention, even when a dropout occurs in an image signal supplied from a recording/reproducing system, a reproduction-only system, etc. adaptive control of the interpolation processing and the motion detection processing of the receiving system are attained by using a dropout signal supplied from an external apparatus, thereby preventing the image quality from being deteriorated. At the same time, it is possible to simplify the structure of the system. Thus, the present invention has a great practical effect.

We claim:

1. A receiving system for a band-compression image signal having input means supplied with an image signal subjected to band-compression processing like multiple sub-Nyquist sampling and a dropout signal representing a dropout portion of the image signal, said receiving system comprising: a first delay circuit for inter-frame interpolation; a dropout compensation circuit including a second delay circuit for delaying at least one horizontal scanning period; a signal selection circuit connected to respective outputs of said first delay circuit and said dropout compensation circuit for selecting one of an image signal and outputs of said first delay circuit and said dropout compensation circuit; a motion detection circuit connected to said first delay circuit; a temporal filter including a third delay circuit for expanding an output of said motion detection circuit along the time axis; and a signal selection control circuit producing an output for controlling said signal selection circuit, the output of said signal selection control circuit being processed by an output signal of said third delay circuit and the dropout signal.

2. A receiving system for a band-compression image signal according to claim 1, wherein a control signal is supplied to said signal selection circuit from said signal selection control circuit so that said signal selection circuit responds to an output signal of said third delay circuit to select an output of said dropout compensation circuit for a portion of the image signal representing a moving image and to select an output of said first delay circuit for a portion of the image signal representing a static image.

3. A receiving system for a band-compression image signal according to claim 1, wherein said temporal filter is controlled by the dropout signal to shorten an expansion time of an output signal of said motion detection circuit.

4. A receiving system for a band-compression image signal according to claim 1, wherein said temporal filter is a cyclic filter comprising a coefficient circuit for multiplying a predetermined coefficient, a field memory for delaying an output of said coefficient circuit by one field and feeding back a resultant delayed signal, and a maximum selection circuit for selecting a greater one of a feedback motion quantity and a present motion quantity, a multiplication coefficient of said coefficient circuit being changed by the dropout signal to shorten an expansion time of the motion quantity.

* * * * *